Figure 1:
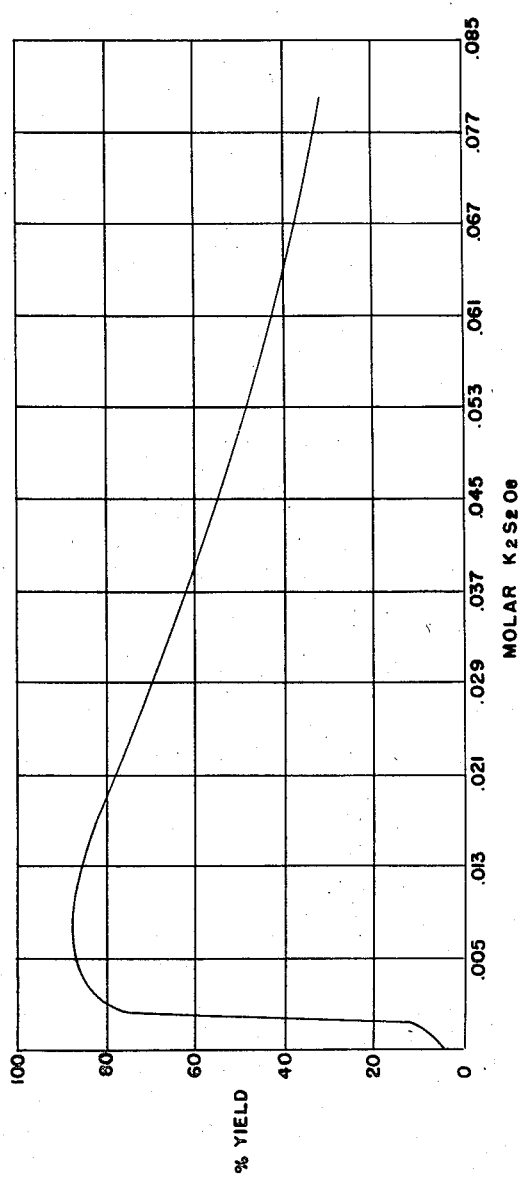

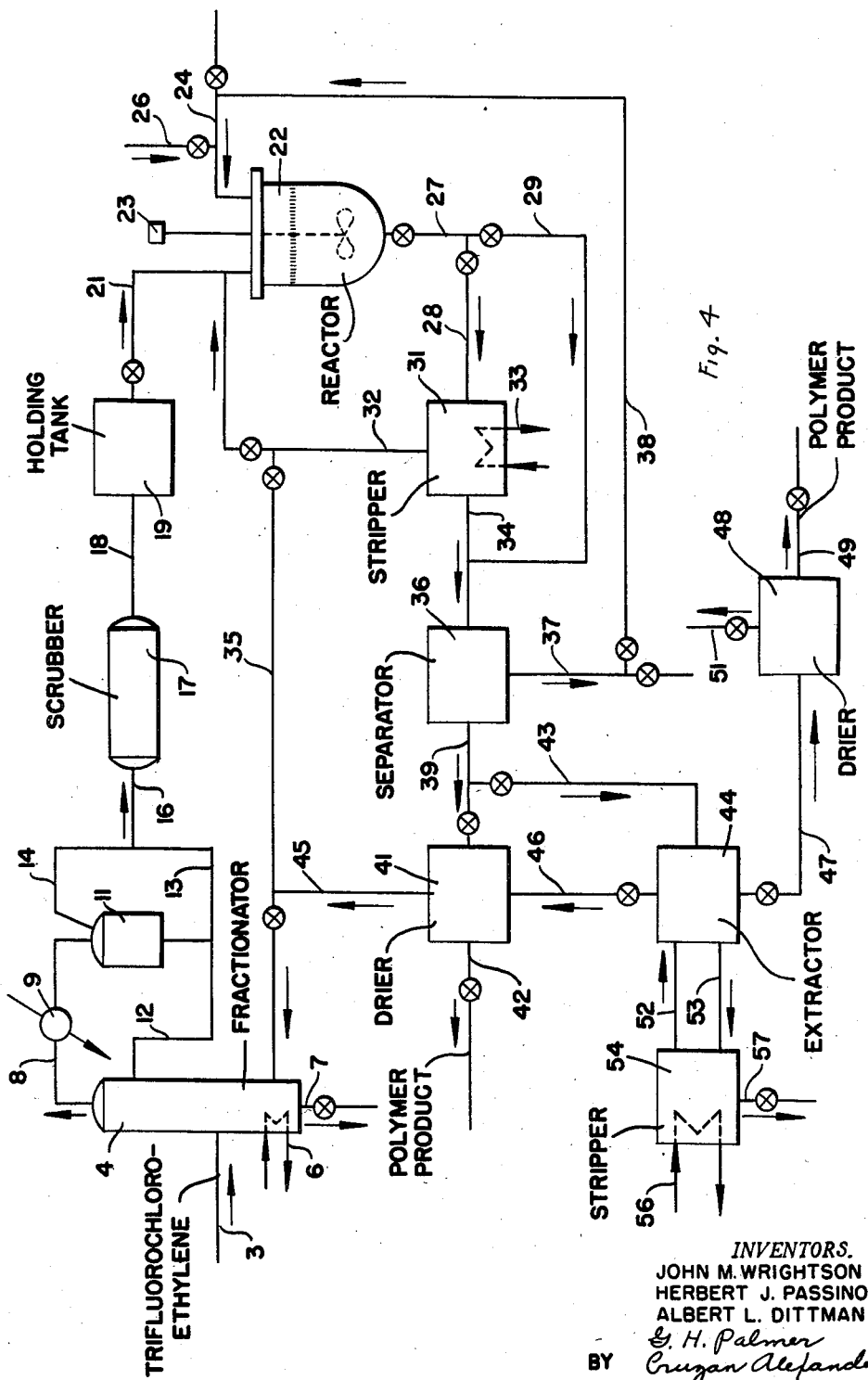

United States Patent Office 2,837,505
Patented June 3, 1958

2,837,505

MANUFACTURE OF FLUORINE-CONTAINING POLYMERS

Albert L. Dittman, North Bergen, and Herbert J. Passino, Englewood, N. J., and John M. Wrightson, Whittier, Calif., assignors, by mesne assignments, to Minnesota Mining and Manufacturing Company, St. Paul, Minn., a corporation of Delaware Application May 11, 1954, Serial No. 428,972

5 Claims. (Cl. 260—92.1)

This invention relates to the manufacture of fluorine-containing polymers. In one aspect this invention relates to the polymerization of halogenated olefins containing fluorine to produce polymers containing fluorine. In another aspect the invention relates to the polymerization of perhalo olefins in the presence of an aqueous suspension medium to produce a polymer. In still another aspect the invention relates to the polymerization of trifluorochloroethylene in the presence of an aqueous suspension medium to produce a normally solid polymer of high chemical and physical stability. This application is a continuation-in-part of application Serial No. 213,524, filed March 2, 1951, now U. S. Patent No. 2,689,241, and application Serial No. 61,082, filed November 19, 1948, and now abandoned.

Various olefins containing fluorine may be polymerized under suitable conditions to produce polymers in the form of liquids, waxes and solids. Under suitable reaction conditions, trifluorochloroethylene, for example, polymerizes to produce a range of molecular weight polymers useful for various purposes. These polymers, produced from trifluorochloroethylene, are relatively inert chemically and have good physical properties in general. The oily polymer of trifluorochloroethylene may be used as a lubricant or insulating medium. The waxes of trifluorochloroethylene are also useful in making up lubricating compositions and for impregnating various materials to make them chemically resistant. The solid polymer of trifluorochloroethylene in its high molecular weight stage has the characteristics of a thermoplastic and is useful for a variety of purposes for which plastics may be used.

The present method of polymerizing trifluorochloroethylene is by a bomb type reaction at a relatively low temperature. The trifluorochloroethylene monomer is introduced into a bomb type reactor which is maintained at a temperature of about −17° C. for a period of about seven days. The monomer is converted to a porous plug of solid polymer in the reaction vessel with approximately 30 percent yield of polymer based on the monomer charged. The unreacted monomer is included in the interstices of the porous plug and may be removed therefrom by heating the plug in the reaction vessel under subatmospheric pressure so that the monomer is evaporated. After the monomer is evaporated, the plug is removed from the reaction vessel and broken into chips or granules for shipping, molding, etc.

The object of this invention is to provide a commercially feasible process of polymerizing halogenated olefins containing fluorine to produce a polymer in relatively high yields.

Another object of this invention is to provide a process in which a rapid and economical polymerization of perhaloolefins, such as trifluorocholoroethylene, can be effected.

Another object of this invention is to provide an accelerator for increasing the yield and shortening the time of polymerization of halogenated olefins.

Various other objects and advantages of the present invention will become apparent to those skilled in the art from the accompanying description and disclosure.

As herein defined, polymerization refers to the polymerization of a single monomer and also to the copolymerization of unlike monomers to produce polymers.

According to this invention, a substituted ethylene containing at least two fluorine atoms, preferably at least one fluorine atom per carbon atom of the aliphatic portion of the substituted ethylene, is polymerized in the presence of an aqueous suspension medium under suitable conditions of temperature, pressure, residence time and promoting agents to produce a polymer, either liquid, wax or solid. The polymerization process of this invention may be effected in either a batchwise or continuous manner. The monomer is admixed with the aqueous suspension medium in a suitable polymerization zone which is maintained at the appropriate conditions of polymerization and under sufficient pressure to maintain the aqueous solution as a liquid under the conditions of polymerization. The monomer and water are agitated by suitable means in the reaction zone so as to intimately disperse the monomer in the aqueous suspension medium. The monomer and polymer are substantially insoluble in the aqueous dispersion medium. The separation of the polymer from the water phase may be effected by settling and decantation, by filtering, by centrifuging, by evaporation; or by various other conventional methods, depending upon whether the polymer is in a liquid or solid state.

The present invention is particularly applicable to the homopolymerization of perfluorochloro olefins, such as trifluorochloroethylene. However, the invention contemplates the polymerization of various halogenated olefins. For example, perfluorobutadiene, perfluoropropene, phenyltrifluoroethylene, alpha methyl phenyl difluoroethylene, perfluoro acrylonitrile, perfluorostyrene, perfluorocyclobutene, perfluorocyclobutadiene, tetrafluoroethylene, vinylidene fluoride, trifluoroethylene and difluorodichloroethylene. As previously mentioned, the invention applies to the copolymerization of these monomers, as well as their homopolymerization. For example, the invention applies to the copolymerization of trifluorochloroethylene and tetrafluoroethylene, of trifluorochloroethylene and vinylidene fluoride, trifluorochloroethylene and vinyl fluoride, trifluorochloroethylene and vinyl chloride, trifluorochloroethylene and vinylidene chloride, trifluorochloroethylene and perfluoropropene, trifluorochloroethylene and trifluoroethylene, and of perfluorobutadiene and perfluorostyrene. In these copolymerizations, the second monomer is also preferably a fluorinated olefin and preferably containing at least two fluorine atoms per molecule. When less than 5 weight percent comonomer is employed, the polymerization is broadly included within the term homopolymerization.

The quantity of water employed as the aqueous suspension medium is usually between about 0.05 to about 10 times by volume of the quantity of total monomer present in the reaction zone. Preferably, the quantity of water is between one and five times the total monomer in the reaction zone.

The temperatures employed for the polymerization will depend to a certain extent upon the particular monomers being polymerized. In general, the temperatures range between about 0° C. and 250° C. in conjunction with a suitably high pressure to maintain the monomer and water in the liquid state. Pressures range from about 20 to about 1500 pounds per square inch gage, the lower pressures being used usually with the lower temperatures of polymerization. The higher temperatures are employed in the above range for the production of the liquid polymers, while the lower temperatures are usually employed for the production of solid polymers. For example, in the production of solid polymers of trifluorochloroethylene, temperatures between about 0° C. and about 30° C. or 40° C. are preferred, and for producing the liquid polymer of the same monomer, temperatures between about 75° C. and about 200° C. are preferred.

Similarly, the time of polymerization will depend upon the particular monomer being polymerized but, also, upon such factors as the composition of the monomer, molecular weight of the ultimate polymer, the temperature of polymerization and the type of promoter and activator being employed. In general, the polymerization time is between about 10 minutes and about 50 hours and usually between about 5 and about 35 hours.

The aqueous phase type of polymerization for the above monomers usually requires a suitable promoting agent for effecting the polymerization in a reasonable length of time and to produce a polymer of the desired molecular weight. These promoting agents fall in three general classes; promoters, activators and accelerators. In almost all instances, a promoter must be used. Such promoters comprise the inorganic peroxides. Examples of suitable inorganic peroxides are the water soluble peroxide, such as the perborates, persulfates, perphosphates, percarbonates, barium peroxide, zinc peroxide and hydrogen peroxide. Particularly valuable are the water soluble salts of the peracids, such as sodium, potassium, calcium, barium and ammonium salts of the persulfuric and perphosphoric acids which may be prepared in the conventional manner by electrolytic oxidation of salts of the corresponding oxy acids. Suitable concentrations of the promoter lies within the range of 0.003 molar to about 0.1 molar. The exact quantity of promoter will depend upon the monomer, molecular weight of the polymer desired and the particular promoter being employed. For example, in the polymerization of trifluorochloroethylene to produce the solid polymer thereof having a softening point above 200° C., a promoter concentration between about 0.003 and about 0.07 molar, or about 0.01 and about 2 percent by weight based on water, is preferred. Somewhat higher concentrations are employed for producing the liquid polymer.

Promoters are also preferably used in conjunction with an activator to increase the yield of polymer. Such activators comprise sodium bisulfite, sodium hydrosulfite, sodium thiosulfate and trimethylamine, and in general any water soluble reducing agent. These activators are generally employed in concentrations similar to the concentration of promoter employed. Equal molar amounts of promoter and activator are preferred.

Buffering agents may be employed also to obtain optimum pH conditions. For example, when an alkaline pH is desired, buffers such as borax, disodium phosphate, sodium carbonate, ammonium carbonate, and sodium acetate may be used. For an acid pH, acetic acid, propionic acid and monosodium phosphate may be employed. It is preferred to maintain a pH between about 1 and about 4.

In accordance with this invention, it has been found that the yield of polymer may be substantially increased and the time of polymerization may be substantially decreased by the use of accelerators, such accelerators being the ionizable inorganic water soluble salts of an accelerating element which element in its oxidized state is more readily reducible than the promoter and in its reduced state is more readily oxidizable than the activator; preferably, the salts of the heavy metals, such as iron, manganese and chromium. Various water soluble salts of an accelerating element of the above definition may be employed other than the metals given above. Examples of other accelerating elements are cobalt, silver, copper, nickel, molybdenum, and iodine. The accelerating element is introduced into the aqueous reaction mixture in the form of the water soluble salts, preferably as the low valence form of the accelerating element, and after introduction and dissolution therein the salts ionize. Various salts of the accelerating element comprise the hydroxides, carbonates, sulfates, phosphates, nitrates and chlorides. These salts of the accelerating element are admixed with the reaction mixture in an amount sufficient to maintain the concentration of the accelerating element or elements between about 1 and about 2000 p. p. m. based on water. For the best results, the concentration of accelerating element or admixtures of accelerating elements is preferably maintained between about 5 and about 300 p. p. m. in the aqueous phase during the polymerization. In the polymerization of trifluorochloroethylene in a potassium persulfate-sodium bisulfite aqueous system, an iron sulfate is admixed with the reaction mixture in an amount sufficient to maintain the concentration of the accelerating element between about 10 and about 100 p. p. m. during the polymerization.

It is preferred to maintain the water phase substantially free from water soluble organic compounds, such as alcohols and ketones, since such compounds are inhibitors for the polymerization of trifluorochloroethylene and have a marked adverse effect on the polymerization reaction and on the characteristics of the product produced. The use of purified or distilled water is thus preferred.

In carrying out the process of this invention using an accelerator, the polymerization is effected in a vessel or conduit which is not capable of being attacked by the ingredients employed in the polymerization. Suitable corrosive resistant materials useful for construction or lining of the reaction vessel or conduit comprise stainless steel, Inconel, Monel, silver, nickel, glass or fluorinated solid polymers.

In all cases, the liquid in the reaction zone must be vigorously agitated to maintain the reactant and promoting agents in intimate contact. The vigorous agitation of the liquid phase of the reactor may be obtained by high speed stirring, such as with small propellers connected by means of a shaft to a high speed electric motor. Forced circulation of the liquid phase through orifices or small diameter conduits is also an effective method for achieving intimate mixing of the reactant, water and promoting agents. In general, any system suitable for obtaining a mechanical dispersion or suspension without using detergents will be applicable; in most instances detergents being harmful to the polymerization reaction.

It is within the scope of this invention to disperse finely divided solids in the liquid phase as a suspension for the purpose of acting as fillers for the polymer product and for the purpose of forming nuclei for the start of the polymerization. The following are examples of such fillers: various pigments, such as titanium dioxide, carbon black; clays; asbestos; glass fiber; and other relatively inert solids.

The following runs are offered as a better understanding of the present invention and indicate the appropriate conditions of polymerization and examples of promoters, activators and accelerators. The runs and conditions are not to be considered unnecessarily limiting to the present invention.

Figure 2:
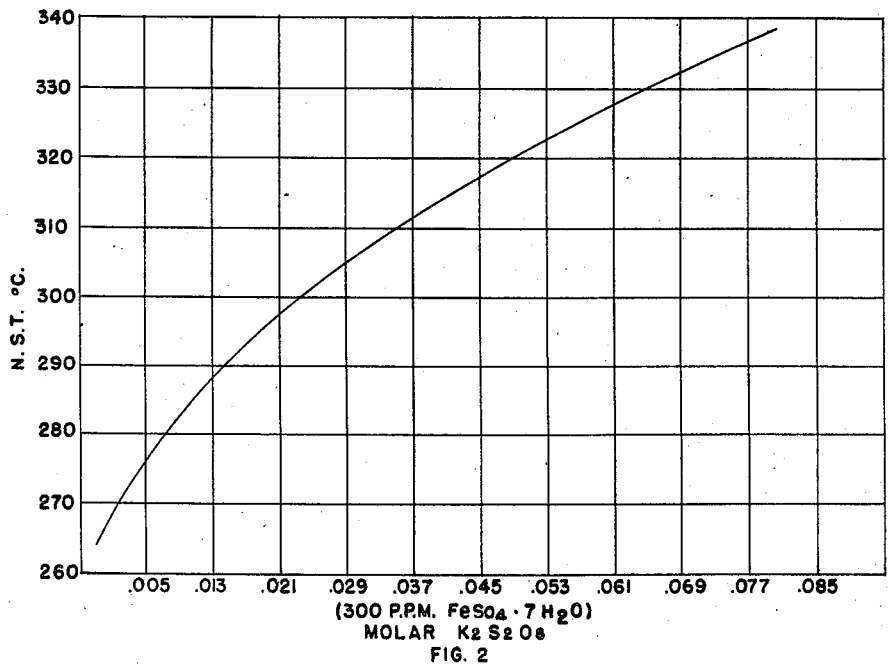

Table I illustrates typical runs in glass reaction tubes. The weight ratio of water to monomer in these runs was about 2.5:1 and equimolar concentrations of potassium persulfate and sodium bisulfite was employed unless otherwise noted to the contrary in the right column. Table II illustrates typical runs in stainless steel reaction bombs. All runs were made at 5° C. for 24 hours except as noted. Figure 1 of the drawing is a graph of percent yield of solid polymer versus molar concentration of potassium persulfate employing an equimolar quantity of sodium bisulfite and 100 p. p. m. $FeSO_4 \cdot 7H_2O$. Figure 2 of the drawing is a graph of N. S. T. of the solid product of polymerization versus molar concentration of potassium persulfate employing an equimolar quantity of sodium bisulfite and 300 p. p. m. $FeSO_4 \cdot 7H_2O$.

Figure 3:
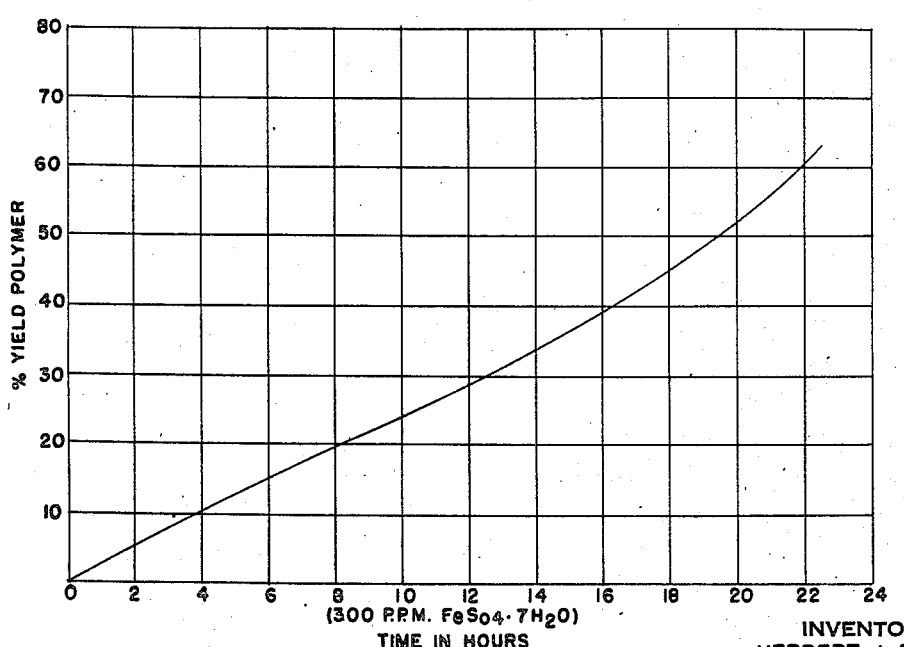

Figure 3 of the drawing is a graph of percent yield of solid polymer versus reaction time in hours employing an equimolar quantity of sodium bisulfite and 300 p. p. m. $FeSO_4 \cdot 7H_2O$.

sheet and cut into a strip of 1/8" x 1/16" x 1 5/8". The strip is notched 5/8" from the top so that the dimension at the notch shall be 1/16" x 1/16". A fine wire and a standard weight is attached to one end of the strip. The weight of the polymer plus the wire and standard weight shall equal 1/2 grams. The strip is then attached in a furnace and fixed vertically therein. The temperature of the sample is increased at a rate of about 1 1/2° C. per minute in the furnace as the breaking temperature

TABLE I

| Run No. | $K_2S_2O_8$ molar conc. | Temp., °C. | Time, hrs. | Percent yield | Percent $K_2S_2O_8$ remaining | N. S. T., °C. | pH | $FeSO_4 \cdot 7H_2O$, p. p. m. |
|---|---|---|---|---|---|---|---|---|
| 1 | 0.074 | 10 | 22 | 80.8 | 73.0 | 313 | 1.90 | 100. |
| 2 | 0.074 | 10 | 22 | 83.1 | 58.2 | 314 | 1.80 | 200. |
| 3 | 0.074 | 10 | 22 | 88.1 | 66.2 | 319 | 1.80 | 300. |
| 4 | 0.074 | 10 | 22 | 87.2 | 60.8 | 285 | 1.70 | 400. |
| 5 | 0.0185 | 10 | 22 | 84.0 | 80.1 | 302 | 2.00 | 25. |
| 6 | 0.0185 | 10 | 22 | 84.4 | 83.8 | 291 | 2.05 | 50. |
| 7 | 0.0185 | 10 | 22 | 87.8 | 81.1 | 284 | 1.90 | 75. |
| 8 | 0.0185 | 10 | 22 | 88.3 | 73.0 | 282 | 1.90 | 100. |
| 9 | 0.00037 | 5 | 20 | 5.7 | | | 2.75 | 100. |
| 10 | 0.00185 | 5 | 20 | 6.9 | | | | 100. |
| 11 | 0.0037 | 5 | 20 | 85.4 | | 271 | | 100. |
| 12 | 0.0074 | 5 | 20 | 88.0 | | 282 | | 100. |
| 13 | 0.0111 | 5 | 20 | 88.0 | | 293 | | 100. |
| 14 | 0.0148 | 5 | 20 | 87.0 | | 290 | | 100. |
| 15 | 0.0185 | 5 | 20 | 0.0 | | | | 100. |
| 16 | 0.0185 | 5 | 20 | 49.0 | | 284 | | 5. |
| 17 | 0.074 | 5 | 2 | 5.8 | 74.4 | | 1.9 | 300. |
| 18 | 0.074 | 5 | 4 | 12.5 | 77.4 | | 1.88 | 300. |
| 19 | 0.074 | 5 | 6 | 13.5 | 70.3 | | 1.90 | 300. |
| 20 | 0.074 | 5 | 17 | 17.9 | 67.6 | | 1.80 | 300. |
| 21 | 0.074 | 5 | 17 | 41.7 | 73.0 | 328 | 1.82 | 300. |
| 22 | 0.074 | 5 | 21 | 55.4 | 75.7 | 328 | 1.82 | 300. |
| 23 | 0.074 | 5 | 24 | 71.9 | 73.0 | 332 | 1.80 | 300. |
| 24 | 0.074 | 5 | 7 | 26.8 | 73.0 | 322 | 1.80 | 300. |
| 25 | 0.037 | 5 | 24 | 83.4 | 75.6 | 305 | 1.80 | 300, 0.037 molar conc. $Na_2S_2O_5$. |
| 26 | 0.056 | 5 | 24 | 61.8 | 82.2 | 324 | 1.88 | 300, 0.056 molar conc. $Na_2S_2O_5$. |
| 27 | 0.074 | 5 | 24 | 18.9 | 86.5 | | 1.75 | 300, 0.074 molar conc. $Na_2S_2O_5$. |
| 28 | 0.074 | 5 | 24 | 9.05 | 82.5 | | 1.70 | 300, 0.111 molar conc. $Na_2S_2O_5$. |
| 29 | 0.074 | 5 | 24 | 24.8 | 89.2 | 330 | 1.90 | 300, 0.037 molar conc. $Na_2S_2O_5$. |
| 30 | 0.074 | 5 | 24 | 66.3 | 90.6 | 321 | 1.92 | 300, 0.0185 molar conc. $Na_2S_2O_5$. |
| 31 | 0.074 | 5 | 24 | 71.2 | 94.5 | 331 | 1.90 | 300, 0.011 molar conc. $Na_2S_2O_5$. |
| 32 | 0.074 | 5 | 24 | 86.2 | | 344 | | 300, 0.074 $Na_2S_2O_5$, 98 mole percent $CClF=CF_2$, 2 mole percent $CH_2=CF_2$. |

TABLE II

*Stainless steel reaction bomb runs*

| Run No. | $K_2S_2O_8$ molar conc. | $NaHSO_3$ molar conc. | Percent yield | Percent $K_2S_2O_8$ remaining | NST, °C. | Remarks |
|---|---|---|---|---|---|---|
| 1 | 0.074 | 0.074 | 21.1 | 73 | 333 | 300 p. p. m. $FeSO_4 \cdot 7H_2O$. |
| 2 | 0.074 | 0.074 | 8.6 | 94.5 | | 5 p. p. m. $FeSO_4 \cdot 7H_2O$. |
| 3 | 0.074 | 0.074 | 20.8 | | | 300 p. p. m. $FeSO_4 \cdot 7H_2O$. |
| 4 | 0.037 | 0.074 | 66.1 | 44.6 | 310 | All polymer was powder. 300 p. p. m. $FeSO_4 \cdot 7H_2O$. |
| 5 | 0.037 | 0.074 | 52.5 | | | 300 p. p. m. $FeSO_4 \cdot 7H_2O$. |
| 6 | 0.037 | 0.074 | 39.7 | | | 300 p. p. m. $FeSO_4 \cdot 7H_2O$. |
| 7 | 0.037 | 0.074 | 83.0 | | 310 | Polymer was part powder and part balls. 300 p. p. m. $FeSO_4 \cdot 7H_2O$. |
| 8 | 0.0037 | 0.074 | 83.2 | | 313 | Polymer was part powder and part balls. 300 p. p. m. $FeSO_4 \cdot 7H_2O$. |
| 9 | 0.0037 | 0.074 | 93.3 | | 325 | Polymer was part powder and part balls. 300 p. p. m. $FeSO_4 \cdot 7H_2O$. |
| 10 | 0.074 | 0.074 | 15.7 | 81.2 | 314 | 300 p. p. m. $FeSO_4 \cdot 7H_2O$. pH of reaction mixture 1.9. |
| 11 | 0.074 | 0.074 | 21.4 | 74.3 | 322 | 300 p. p. m. $FeSO_4 \cdot 7H_2O$. pH of reaction mixture 1.82. |
| 12 | 0.0185 | 0.0185 | 8.7 | | 290 | Iron, chromium and manganese ions present, 25° C.—66 hours. |
| 13 | 0.0185 (Thiosulfate) | 0.037 | 6.3 | | 290 | Distilled water, 25° C.—66 hours. |

Runs 1 to 11 made at 5° C. for 24 hours.

To further distinguish the solid polymer over the corresponding oils and waxes produced with the same monomer, the solid polymer is described by reference to its no strength temperature. A no strength temperature (N. S. T.) of between about 210° C. and about 350° C. is characteristic of a normally solid polymer of the above preparation having thermoplastic characteristics. Best plastic characteristics of the normally solid polymer are observed at N. S. T. values between about 240° C. and about 340° C. The N. S. T. value of the polymer depends upon the polymerization conditions, such as temperature, residence time, concentration and type of promoter agents, pressure, etc.

The no strength temperature (N. S. T.) is determined in the following manner: A thermoplastic sample of polytrifluorochloroethylene is hot pressed into a 1/16" thick sheet and cut into a strip of 1/8" x 1/16" x 1 5/8". The strip is notched 5/8" from the top so that the dimension at the notch shall be 1/16" x 1/16". A fine wire and a standard weight is attached to one end of the strip. The weight of the polymer plus the wire and standard weight shall equal 1/2 grams. The strip is then attached in a furnace and fixed vertically therein. The temperature of the sample is increased at a rate of about 1 1/2° C. per minute in the furnace as the breaking temperature is approached. The no strength temperature is the breaking temperature of the sample. Differences of about 5° C. are considered significant.

Figure 4 of the drawings is a diagrammatic illustration of an arrangement of apparatus in elevation for a continuous process for the production of a normally solid homopolymer from the monomer trifluorochloroethylene. The starting material trifluorochloroethylene may be prepared by dechlorinating Freon 113, trifluorotrichloroethane, in the presence of powdered zinc. According to the drawing, trifluorochloroethylene together with any impurities accompanying the monomer is introduced into a fractional distillation column 4 through conduit 3. Recycled monomer is introduced into the lower portion of column 4 through conduit 35. In fractionator 4, trifluorochloroethylene is recovered as an overhead fraction in substantially pure form. Liquid bottoms are maintained at the desired temperature of about 86° C. at atmospheric pressure by a conventional heating or cooling element 6. Undesirable high boiling components or impurities accompanying the trifluorochloroethylene are withdrawn from fractionator 4 through conduit 7 for disposal. These undesirable components comprise alcohol and acidic by-products. Vaporous trifluorochloroethylene is removed from the upper portion of fractionator 4 and passed through conduit 8 and condenser 9 to accumulator 11. At least a portion of the trifluorochloroethylene is condensed by condenser 9 which is maintained at a temperature of about −28° C. for atmospheric pressure operations. Condensate is returned from accumulator 11 through a conduit 12 to the upper portion of fractionator 4 as reflux. Alternatively or additionally to refluxing with condensate in conduit 12, internal cooling means (not shown) may be positioned within the upper portion of fractionator 4 for creating an internal reflux.

If only that much of the vapors in conduit 8 are condensed so as to provide reflux to fractionator 4, the remaining vapors are removed from accumulator 11 and are passed through conduits 14 and 16 to a scrubber 17 to remove acidic material from the monomer stream. In treater 17 the monomer stream is contacted with a caustic solution of sodium or potassium hydroxide. This treatment at 17 may also comprise contact with suitable sorbents, such as silica-gel, phosphoric pentoxide and activated carbon, for removal of traces of contaminants, such as alcohol. Scrubber 17 is used in order to obtain a monomer of high purity which is desirable for the polymerization of trifluorochloroethylene to a solid polymer of good physical and chemical properties.

In case it is desired to treat the monomer in the liquid phase, liquid monomer is withdrawn from accumulator 11 and passed through conduits 13 and 16 to scrubber 17 for liquid-liquid contact with a caustic solution. When this modification is employed, condenser 9 is operated so as to condense substantially all of the effluent in conduit 8.

Monomer is withdrawn from scrubber 17 and passed through conduit 18 to a holding tank 19 for storage. In the event the monomer is treated in scrubber 17 in the vapor phase, a condenser (not shown), is provided on conduit 18. From holding tank 19 the purified liquid monomer in appropriate quantities is passed through conduit 21 to a polymerization reactor 22. Water is introduced into reactor 22 through conduit 24. The introduction of water and/or monomer may be intermittent or continuous. A suitable promoter, such as sodium perborate, is also introduced in measured quantities by means of conduits 26 and 24. The temperature of reaction employed may be about room temperature and in order to maintain the monomer in the liquid phase a pressure of about 100 pounds per square inch gage is maintained in reactor 22. Liquid monomer and water are vigorously and intimately admixed in reactor 22 by means of a conventional stirrer 23.

The quantity of water employed in reactor 22 is between about 1 and about 3 times that of the monomer. A preferred amount of sodium perborate is between about 0.5 and about 2 weight percent based on the monomer in reactor 22. The average residence time of the monomer in order to produce solid polymer is between about 5 and about 35 hours. The solid polymer forms as a white powder and is removed as a slurry with water and monomer through conduit 27.

The slurry of solid polymer is passed from reactor 22 through conduits 27 and 28 to a stripping unit 31 in which monomer is stripped from the slurry containing polymer by increasing the temperature and/or decreasing the pressure of the system. Vaporized monomer is withdrawn overhead from stripper 31 through conduit 32 and may be recycled to reactor 22, or all or a portion thereof may be passed through conduit 35 to fractionator 4.

Numeral 33 indicates heating coils for stripping purposes. When passing the monomer from stripper 31 to fractionator 4, a condenser is usually positioned on conduit 35.

A slurry of polymer and water substantially free from monomer is withdrawn from stripper 31 through conduit 34 and is passed to a separator 36. In separator 36, the stripped polymer floats on the water by virtue of which it is easily separated from the water. Water which may contain the promoter or other agents may be recycled to reactor 22 through conduits 37 and 38, if desired. If the water contains undesirable contaminants produced by the reaction, the water may be withdrawn through conduit 37 for disposal.

In some instances the stripping operation in unit 31 may be eliminated and the slurry of polymer, monomer and water passed from reactor 22 through conduits 27, 29 and 34 directly to separator 36 by proper adjustment of the valves on conduits 28 and 29. When the stripping step is eliminated the polymer will be heavier than water and will settle to the bottom of separator 36.

Separated polymer which may or not contain monomer is passed from separator 36 through conduit 39 to drier 41. In drier 41 water and/or monomer is evaporated and passed through conduit 43 for return through conduits 45, 35 and 32 to reactor 22, or to fractionator 4 through conduits 45 and 35. If desired, the vapors removed from drier 41 may be vented to the atmosphere; this usually being the case when the stripping step is employed. On the other hand, when the stripping step is not used the vapors in conduit 45 will contain an appreciable amount of monomer and it is preferred under such circumstances to recycle the monomer to reactor 22 or fractionator 4. Dried polymer is removed from drier 41 through conduit 42 as a product of the process.

In a modification of the present process in which the solid polymer may contain excess amounts of promoter, such as sodium perborate, having adverse effects on the polymer product, the separated solid polymer is passed from conduit 39 through conduit 43 to an extractor 44. In extractor 44 the polymer is washed with an aqueous solution, preferably an aqueous solution of alcohol and water to dissolve the inorganic peroxides contained in the polymer. The solid polymer is allowed to settle in extractor 44 and may be passed through conduit 46 to drier 41, if desired. The aqueous solution containing the extracted peroxides or other impurities is removed from extractor 44 through conduit 53 and passed to a stripper 54. In stripper 54 an overhead fraction comprising an aqueous solution of alcohol and water is obtained and returned to extractor 44 through conduit 52. A bottoms fraction comprising water and impurities, such as inorganic peroxide, is removed from stripper 54 through conduit 57. Since the inorganic peroxide may be useful as a promoter for the polymerization reaction, the stream in conduit 57 may be returned to reactor 22 by means not shown. Element 56 is a heating coil or reboiler for heating stripper 54 to a sufficiently high temperature to vaporize the extracting agent. Methyl alcohol may be admixed in about a 1:1 weight ratio with water for use in extractor 44.

In the event it is undesirable to pass the treated polymer from extractor 44 to drier 41 because of the presence of alcohol which may contaminate the monomer, the extracted polymer may be passed through conduit 47 to drier 48. In drier 48 the alcohol and water contained in the solid polymer is evaporated by regulation of temperature therein in the conventional manner. The vaporized components are removed from drier 48 through conduit 51. Dried polymer is removed from drier 48 through a conduit 49 as a product of the process.

The solid polymer recovered at 42 or 49 may be subjected to further treatment, such as fluorination, pyrolysis, etc., without departing from the scope of this invention.

Various modifications and alterations of the arrangement of the equipment may become apparent to those skilled in the art. Certain pieces of apparatus and auxiliary equipment, such as liquid level controls, flow controls, temperature and pressure controls, valves, pumps, coolers or condensers, heaters and storage vessels have been omitted from the drawing as a matter of convenience and clarity.

The temperature of the reactor may be maintained substantially constant at the desired level by indirect heat transfer with the reactor, such as by immersing the reactor in a liquid bath or by using coils positioned within the reactor. The reactor may also be cooled or heated by controlling the quantity and temperature of the fresh and/or recycled water introduced into the reactor. Because of the high heat transfer rate of the water, temperature control of the reactor is relatively simple and accurate without wide variations in temperature occurring.

The polymerization may be effected without the use of a reducing agent and accelerators without departing from the scope of this invention as shown in the following example:

EXAMPLE

Approximately 51 parts by weight of monomer trifluorochloroethylene, 120 parts by weight of water, and 4 parts by weight of $Na_2B_4O_7 \cdot 10H_2O$ were charged to a reactor. The reactor was maintained at a temperature of about 25° C. under a pressure sufficient to maintain the monomer in the liquid phase. The contents of the reactor were vigorously agitated in order to disperse the monomer as fine droplets in the aqueous phase. After about 32 hours, the contents of the reactor were discharged and a fine white powder of solid polymer was recovered from the water. The polymer represented a yield based on the monomer charged of better than 30 percent and had good physical characteristics comparing favorably to the polymer produced at low temperatures without suspension in water.

The present invention is directed to the use of promoting agents in aqueous dispersion polymerization of substituted ethylenes containing fluorine. Although the invention has been primarily described by reference to the use of a particular accelerator or to the use of a single accelerator or accelerating element, it is within the scope of this invention to use various accelerators alone or in combination or admixture with each other. The invention is also preferably carried out in a system which is constructed or fabricated of noncorrosive materials to minimize or prevent the presence of additional ingredients which would render control of the concentration of accelerating element difficult. Furthermore, for best results the reactants, promoters and dispersing medium should be of high purity and substantially free from other elements or compounds. Thus the purification of the monomer in conventional manner and the use of distilled or pure water is highly desirable.

Various modifications and alterations of the procedures of this invention may become apparent to those skilled in the art without departing from the scope of this invention.

Having described our invention, we claim:

1. A process for polymerizing trifluorochloroethylene to produce a normally solid homopolymer which comprises polymerizing trifluorochloroethylene monomer in admixture with an amount of water between about 1 and about 10 times the amount of monomer at a pressure sufficient to maintain monomer in the liquid phase in the presence of an inorganic water soluble salt of a weak peracid as substantially the sole promoting agent, and maintaining an alkaline pH such that a normally solid homopolymer of trifluorochloroethylene is produced and recovering homopolymer thus produced as a product of the process.

2. The process of claim 1 in which said water soluble salt of a peracid is a perborate.

3. The process of claim 1 in which said water soluble salt of a peracid is a percarbonate.

4. A process for polymerizing trifluorochloroethylene to produce a normally solid homopolymer which comprises polymerizing trifluorochloroethylene monomer in a reaction zone in admixture with an amount of water between about 1 and about 10 times the amount of monomer at a temperature between about 0° C. and about 40° C. at a pressure sufficient to maintain monomer in the liquid phase in the presence of an inorganic water soluble salt of a weak peracid as substantially the sole promoting agent in an amount between about 0.003 and about 0.1 molar percent, maintaining an alkaline pH, maintaining an average residence time of monomer in the reaction zone of between about 5 and about 50 hours such that a normally solid homopolymer of trifluorochloroethylene is produced, maintaining a conversion of at least 30 percent and recovering homopolymer thus produced as a product of the process.

5. A process for polymerizing trifluorochloroethylene to produce a normally solid homopolymer which comprises polymerizing trifluorochloroethylene monomer in a reaction zone in admixture with an amount of water between about 1 and about 10 times the amount of monomer at a temperature of about 0° C. and about 30° C. and at a pressure sufficient to maintain monomer in the liquid phase in the presence of an alkali perborate as substantially the sole promoting agent in an amount between about 0.003 and about 0.07 molar percent, maintaining an alkaline pH, maintaining an average residence time of monomer in the reaction zone between about 5 and about 35 hours such that a normally solid homopolymer of trifluorochloroethylene is produced, and maintaining a conversion of at least 30 percent and recovering homopolymer thus produced as a product of the process.

References Cited in the file of this patent

UNITED STATES PATENTS

| | | |
|---|---|---|
| 2,296,403 | Renfrew et al. | Sept. 22, 1942 |
| 2,393,967 | Brubaker | Feb. 5, 1946 |
| 2,435,537 | Ford et al. | Feb. 3, 1948 |
| 2,531,134 | Kropa | Nov. 21, 1950 |
| 2,569,524 | Hamilton | Oct. 2, 1951 |
| 2,600,202 | Caird | June 10, 1952 |
| 2,613,202 | Roedel | Oct. 7, 1952 |
| 2,689,241 | Dittman et al. | Sept. 14, 1954 |

FOREIGN PATENTS

| | | |
|---|---|---|
| 465,520 | Great Britain | May 3, 1937 |
| 922,429 | France | June 3, 1947 |

OTHER REFERENCES

Hohenstein et al.: India Rubber World 110, 291–294, 300 (1944).